United States Patent
Nishio et al.

(10) Patent No.: US 8,929,304 B2
(45) Date of Patent: Jan. 6, 2015

(54) RADIO COMMUNICATION BASE STATION DEVICE, RADIO COMMUNICATION MOBILE STATION DEVICE, AND CONTROL CHANNEL ALLOCATION METHOD

(75) Inventors: Akihiko Nishio, Kanagawa (JP); Seigo Nakao, Kanagawa (JP); Masaru Fukuoka, Ishikawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 1003 days.

(21) Appl. No.: 12/811,050

(22) PCT Filed: Dec. 26, 2008

(86) PCT No.: PCT/JP2008/004007
§ 371 (c)(1),
(2), (4) Date: Jun. 28, 2010

(87) PCT Pub. No.: WO2009/087742
PCT Pub. Date: Jul. 16, 2009

(65) Prior Publication Data
US 2010/0290418 A1    Nov. 18, 2010

(30) Foreign Application Priority Data
Jan. 4, 2008    (JP) .................................. 2008-000196

(51) Int. Cl.
| | |
|---|---|
| H04B 7/00 | (2006.01) |
| H04L 12/66 | (2006.01) |
| H04W 72/04 | (2009.01) |
| H04L 5/00 | (2006.01) |
| H04J 13/00 | (2011.01) |
| H04L 1/00 | (2006.01) |

(52) U.S. Cl.
CPC ........... *H04W 72/042* (2013.01); *H04L 5/0053* (2013.01); *H04L 5/0007* (2013.01); *H04J 13/0055* (2013.01); *H04L 1/0091* (2013.01); *H04J 13/004* (2013.01); *H04L 1/009* (2013.01); *H04J 13/0077* (2013.01); *H04L 5/0037* (2013.01); *H04L 1/0038* (2013.01)
USPC ........... 370/329; 370/330; 370/343; 370/344; 370/480

(58) Field of Classification Search
USPC .......................... 370/329, 330, 343, 344, 480
See application file for complete search history.

(56) References Cited

U.S. PATENT DOCUMENTS 7,139,334 B2 * 11/2006 Bartlett et al. ................. 375/324
8,027,297 B2 *  9/2011 Kim et al. ..................... 370/329

(Continued)

FOREIGN PATENT DOCUMENTS

WO    2009/001594    12/2008

OTHER PUBLICATIONS

International Search Report dated Apr. 7, 2009.

(Continued)

*Primary Examiner* — Jay P Patel
(74) *Attorney, Agent, or Firm* — Nixon & Vanderhye P.C.

(57) ABSTRACT

Provided is a radio communication station device which can prevent limiting of resource allocation in a UE group. The radio communication device includes: a CCE allocation unit (104); modulation units (103-1 to 103-K); an arrangement unit (108); and a radio transmission unit (111). The CCE allocation unit (104) allocates allocation information allocated to a PDCCH which is inputted from the modulation unit (103-1 to 103-K) as follows. Among a plurality of search spaces shared by a greater number of UE groups as the CCE aggregation size of the PDCCH increases, a particular search space corresponding to the CCE aggregation size of the PDCCH and a mobile group (UE group) of the PDCCH is selected as a space to which the allocation information is to be allocated. The arrangement unit (108) arranges the allocation information in a downlink resource corresponding to the CCE of the particular search space allocated among the downlink resources secured for the PDCCH. The radio transmission unit (111) transmits an OFDM symbol having the allocation information from an antenna (112) to a mobile station.

9 Claims, 10 Drawing Sheets

(56) References Cited

U.S. PATENT DOCUMENTS

| | | | |
|---|---|---|---|
| 8,401,542 B2* | 3/2013 | Chung et al. | 455/423 |
| 2003/0026357 A1* | 2/2003 | Bartlett et al. | 375/324 |
| 2008/0267057 A1* | 10/2008 | Kotecha | 370/203 |
| 2008/0304588 A1* | 12/2008 | Pi | 375/260 |
| 2009/0022110 A1* | 1/2009 | Muharemovic et al. | 370/336 |
| 2009/0046793 A1* | 2/2009 | Love et al. | 375/260 |
| 2009/0073907 A1* | 3/2009 | Cai | 370/311 |
| 2009/0074090 A1* | 3/2009 | Xu et al. | 375/260 |
| 2009/0088148 A1* | 4/2009 | Chung et al. | 455/423 |
| 2009/0103562 A1* | 4/2009 | Frederiksen et al. | 370/468 |
| 2009/0109915 A1* | 4/2009 | Pasad et al. | 370/329 |
| 2009/0116573 A1* | 5/2009 | Gaal et al. | 375/267 |
| 2009/0161618 A1* | 6/2009 | Johansson et al. | 370/329 |
| 2010/0098020 A1* | 4/2010 | Kim et al. | 370/330 |
| 2010/0157927 A1 | 6/2010 | Mochizuki | |

OTHER PUBLICATIONS

3GPP TSG RAN1#50bis, "Search Space Definition: Reduced PDCCH Blind Detection for Split PDCCH Search Space," Motorola, R1-073996, Oct. 2007, pp. 1-4.

3GPP TSG-RAN Working Group 1 #50bis, "Reducing the decoding complexity of the PDCCH," Nokia, Tdoc R1-074317, Oct. 2007, pp. 1-7.

* cited by examiner

RADIO COMMUNICATION BASE STATION DEVICE, RADIO COMMUNICATION MOBILE STATION DEVICE, AND CONTROL CHANNEL ALLOCATION METHOD

TECHNICAL FIELD

The present invention relates to a radio communication base station apparatus, radio communication mobile station apparatus and control channel allocating method.

BACKGROUND ART

In mobile communication, a radio communication base station apparatus (hereinafter abbreviated as "base station") transmits control information for reporting a resource allocation result of downlink data and uplink data, to radio communication mobile station apparatuses (hereinafter abbreviated as "mobile stations"). This control information is transmitted to the mobile stations using downlink control channels such as a PDCCH (Physical Downlink Control CHannel). Each PDCCH occupies one or a plurality of consecutive CCE's (Control Channel Elements). The base station generates PDCCH's on a per mobile station basis, allocates CCE's to be occupied to the PDCCH's according to the number of CCE's required for control information, maps the control information on the physical resources associated with the allocated CCE's, and transmits the results.

For example, in order to satisfy the desired received quality, an MCS (Modulation and Coding Scheme) of a low MCS level needs to be set for a mobile station that is located near the cell boundary of poor channel quality. Therefore, the base station transmits a PDCCH that occupies a larger number of CCE's (e.g. eight CCE's). By contrast, even if an MSC of a high MCS level is set for a mobile station that is located near the center of a cell of good channel quality, it is possible to satisfy the desired received quality. Therefore, the base station transmits a PDCCH that occupies a smaller number of CCE's (e.g. one CCE). Here, the number of CCE's occupied by one PDCCH (i.e. CCE occupation number) is referred to as "CCE aggregation size." For example, when the CCE aggregation sizes of 1, 2, 4 and 8 are used, a mobile station that is located near the cell center tries to receive a PDCCH of the CCE aggregation size of 1, and a mobile station that is located near the cell edge tries to receive a PDCCH of the CCE aggregation size of 8.

Also, a base station allocates a plurality of mobile stations to one subframe and therefore transmits a plurality of PDCCH's at the same time. In this case, the base station transmits control information including CRC bits scrambled by the ID numbers of the destination mobile stations, so that the destination mobile station of each PDCCH can be identified. Further, the mobile stations decode CCE's to which PDCCH's can be arranged, and perform CRC detection after descrambling the CRC bits by their mobile station ID numbers. Thus, mobile stations detect the PDCCH's for those mobile stations by performing blind decoding of a plurality of PDCCH's included in a received signal.

However, when the total number of CCE's is large, the number of times a mobile station performs blind decoding increases. Therefore, in order to reduce the number of times a mobile station performs blind decoding, a method of limiting the CCE's subject to blind decoding on a per mobile station basis, is studied (see Non-Patent Document 1). With this method, a plurality of mobile stations are grouped, and CCE fields to include CCE's subject to blind decoding are limited on a per group basis. For example, when a plurality of mobile stations are grouped into UE groups #1 to #4, among CCE's #0 to #31, four CCE fields of CCE's #0 to #7, CCE's #8 to 15, CCE's #16 to 23, and CCE's #24 to 31, are subject to blind decoding in the UE groups, respectively. By this means, the mobile station of each UE group needs to perform blind decoding of only the CCE field allocated to that mobile station, so that it is possible to reduce the number of times of blind decoding. Here, the CCE field subject to blind decoding by a mobile station is referred to as "search space."

Also, in order to reduce the number of times a mobile station performs blind decoding, studies are underway on a method of limiting in advance the starting location of CCE's occupied by the PDCCH of each CCE aggregation size (see Non-Patent Document 2). With this method, for example, among CCE's #0 to #31, when the CCE aggregation size is 8, the starting locations of CCE's (eight CCE's in this case) occupied by PDCCH's are limited to CCE #0, CCE #8, CCE #16 and CCE #24. By this means, each mobile station needs to perform blind decoding of PDCCH's of a CCE aggregation size starting from the CCE starting locations, so that it is possible to reduce the number of times of blind decoding.

Non-Patent Document 1: 3GPP RAN WG1 Meeting document, R1-073996, "Search Space definition: Reduced PDCCH blind detection for split PDCCH search space," Motorola Non-Patent Document 2: 3GPP RAN WG1 #50bis, R1-074317, "Reducing the decoding complexity of the PDCCH," Nokia

DISCLOSURE OF INVENTION

Problems to be Solved by the Invention

As described in the above prior art, in a case where a plurality of mobile stations are grouped into a plurality of UE groups and a search space is set on a per UE group basis, if a PDCCH of a larger CCE aggregation size is used in a UE group, it may not be able to allocate a PDCCH to other mobile stations. For example, among CCE's #0 to #31, in a UE group having a search space comprised of CCE's #0 to #7, if a PDCCH of a CCE aggregation size of 8 is allocated to a certain mobile station, CCE's #0 to #7 are all occupied, and therefore it is not possible to allocate a PDCCH to other mobile stations. Thus, resource allocation for mobile stations in UE groups is limited, and, consequently, there is a possibility that large transmission delay occurs or control information cannot be transmitted to a mobile station having good channel quality, which degrades the cell throughput.

It is therefore an object of the present invention to provide a radio communication base station apparatus, radio communication mobile station apparatus and control channel allocating method for preventing resource allocation in UE groups from being limited.

Means for Solving the Problem

The radio communication base station apparatus of the present invention employs a configuration having: an allocating section that allocates a control channel, which occupies one or a plurality of control channel elements, to a specific control channel element field associated with a number of control channel elements occupied by the control channel and a UE group of the control channel, among a plurality of control channel element fields shared by a larger number of user equipment groups when the number of control channel elements occupied by the control channel increases; and a transmitting section that transmits the control channel allocated to the specific control channel element field.

Advantageous Effect of the Invention

According to the present invention, it is possible to prevent resource allocation in UE groups from being limited.

BEST MODE FOR CARRYING OUT THE INVENTION

Embodiments of the present invention will be explained below in detail with reference to the accompanying drawings. In the following explanation, assume that the total number of CCE's to which PDCCH's are allocated is 32, from CCE #0 to CCE #31, and the PDCCH CCE aggregation size is one of 1, 2, 4 and 8. Also, if one PDCCH occupies a plurality of CCE's, the plurality of CCE's occupied by the PDCCH are consecutive.

Also, in each CCE aggregation size, the starting location of CCE's to which a PDCCH is allocated is set in advance. To be more specific, when the CCE aggregation size is 1, a PDCCH is allocated to one of CCE #0 to CCE #31. Also, when the CCE aggregation size is 2, a PDCCH is allocated to two CCE's with starting locations of CCE #0, CCE #2, CCE #4, . . . , CCE #28 and CCE #30. Similarly, when the CCE aggregation size is 4, a PDCCH is allocated to four CCE's with starting locations of CCE #0, CCE #4, CCE #8, CCE #12, CCE #16, . . . , CCE #24 and CCE #28, and, when the CCE aggregation size is 8, a PDCCH is allocated to eight CCE's with starting locations of CCE #0, CCE #8, CCE #16 and CCE #24.

Also, in the following explanation, depending on the position of each mobile station in a cell, the CCE aggregation size of a PDCCH to be received by that mobile station is determined. For example, a mobile station that is located near the cell edge has poor channel quality and therefore is likely to perform transmission with a lower MCS. Consequently, the CCE aggregation size for a mobile station that is located near the cell edge is limited to 4 or 8. By contrast, a mobile station that is located near the cell center has good channel quality and therefore is likely to perform transmission with a higher MCS. Consequently, the CCE aggregation size for a mobile station that is located neat the cell center is limited to 1 or 2. Each mobile station may determine the CCE aggregation size of a PDCCH to be received by that mobile station, based on the location of that mobile station in a cell decided from received quality, and so on, or may be notified in advance of the CCE aggregation size of a PDCCH to be received by that mobile station.

Also, in the following explanation, mobile stations that are located in a cell are grouped into four mobile station groups (i.e. UE groups #1 to #4). Here, the mobile station groups to which mobile stations belong may be reported per mobile station from a base station, or may be determined implicitly by a mobile station ID.

Also, assume that downlink data is transmitted by OFDM (Orthogonal Frequency Division Multiplexing), and uplink data is transmitted by SC-FDMA (Single-Carrier Frequency Division Multiple Access). Also, assume that a response signal transmitted in uplink is subjected to the first spreading by a ZAC (Zero Auto Correlation) sequence and second spreading by a block-wise spreading code sequence.

Embodiment 1

Figure 1:
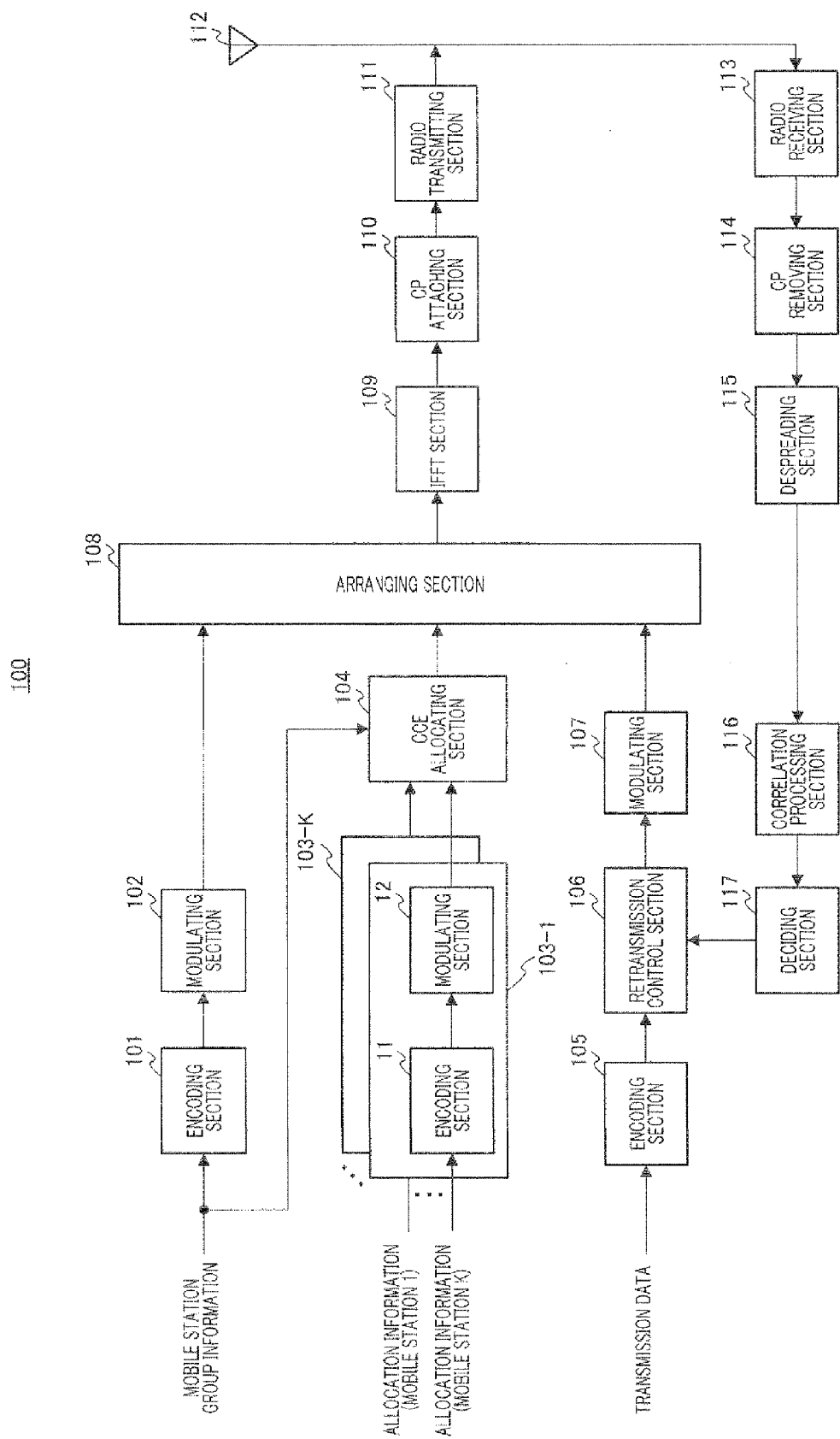
FIG. 1 is a block diagram showing the configuration of a base station according to Embodiment 1 of the present invention.
Figure 2:
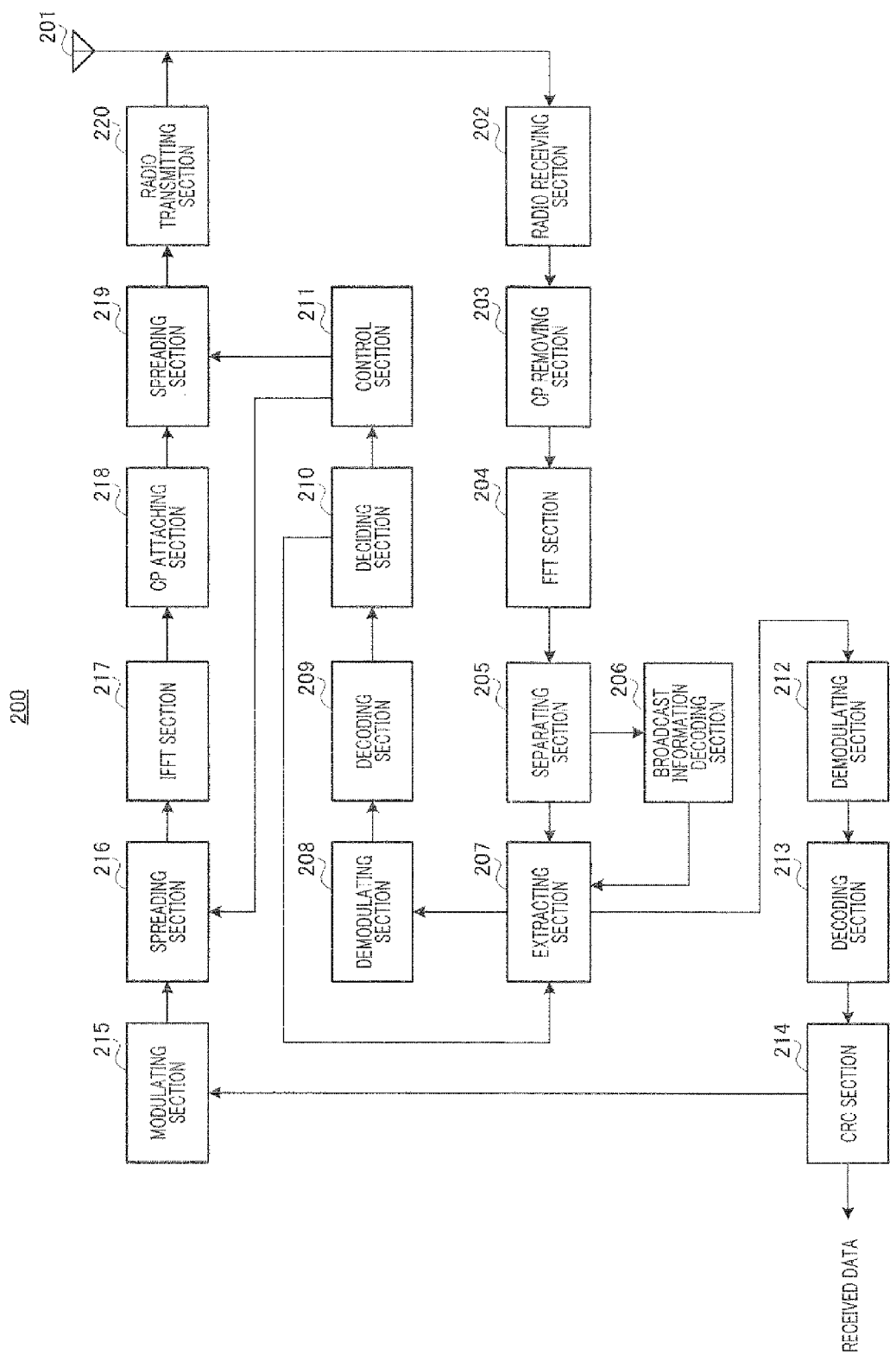
FIG. 2 is a block diagram showing the configuration of a mobile station according to Embodiment 1 of the present invention.

FIG. 1 shows the configuration of base station 100 according to the present embodiment, and FIG. 2 shows the configuration of mobile station 200 according to the present embodiment.

Here, to avoid complicated explanation, FIG. 1 shows components associated with transmission of downlink data that is closely related to the present invention and components associated with reception of uplink response signals to that downlink data, and the illustration and explanation of the components associated with reception of uplink data will be omitted. Similarly, FIG. 2 shows components associated with reception of downlink data that is closely related to the present invention and components associated with transmission of uplink response signals to that downlink data, and the illustration and explanation of the components associated with transmission of uplink data will be omitted.

In base station 100 shown in FIG. 1, encoding section 101 receives as input mobile station group information indicating the search space definition of each mobile station group (i.e. UE groups #1 to #4). Further, encoding section encodes the mobile station group information received as input, and outputs the result to modulating section 102. Next, modulating section 102 modulates the encoded mobile station group information received as input from encoding section 101, and outputs the result to arranging section 108.

Encoding and modulating sections 103-1 to 103-K receive as input resource allocation information for uplink data or downlink data directed to mobile stations. Here, each allocation information is allocated to a PDCCH of the CCE aggregation size required to transmit that allocation information. Further, encoding and modulating sections 103-1 to 103-K are provided in association with maximum K mobile stations #1 to #K. In encoding and modulating sections 103-1 to 103-K, encoding sections 11 each encode allocation information allocated to input PDCCH's, and output the results to modulating sections 12. Next, modulating sections 12 each modulate the encoded allocation information received as input from encoding sections 11, and output the results to CCE allocating section 104.

CCE allocating section 104 allocates the allocation information received as input from modulating sections 103-1 to 103-K, to one or a plurality of CCE's based on mobile station group information. To be more specific, CCE allocating section 104 allocates a PDCCH to a specific search space associated with the CCE aggregation size and mobile station group ("UE group") of that PDCCH, among a plurality of search spaces which are shared by a larger number of UE groups when the PDCCH CCE aggregation size increases. Further, CCE allocating section 104 outputs allocation information allocated to CCE's, to arranging section 108. Here, the PDCCH allocation processing in CCE allocating section 104 will be described later in detail.

On the other hand, encoding section 105 encodes transmission data (i.e. downlink data) received as input, and outputs the result to retransmission control section 106. Here, if there are a plurality items of transmission data for a plurality of mobile stations, encoding section 105 encodes each of the plurality items of transmission data for these mobile stations.

Upon the initial transmission, retransmission control section 106 holds and outputs encoded transmission data of each mobile station to modulating section 107. Here, retransmission control section 106 holds transmission data until an ACK from each mobile station is received as input from deciding section 117. Further, if a NACK from each mobile station is received as input from deciding section 117, that is, upon retransmission, retransmission control section 106 outputs transmission data associated with that NACK to modulating section 107.

Modulating section 107 modulates encoded transmission data received as input from retransmission control section 106, and outputs the result to arranging section 108.

Arranging section 108 arranges allocation information to downlink resources associated with allocated CCE's among downlink resources secured for PDCCH's, arranges mobile station group information to downlink resources secured for broadcast channels, and arranges transmission data to downlink resources secured for transmission data. Further, arranging section 108 outputs signals to which those channels are allocated, to IFFT (Inverse Fast Fourier Transform) section 109.

IFFT section 109 generates an OFDM symbol by performing an IFFT of a plurality of subcarriers to which allocation information, mobile station group information or transmission data is allocated, and outputs the result to CP (Cyclic Prefix) attaching section 110.

CP attaching section 110 attaches the same signal as the signal at the tail end part of the OFDM symbol, to the head of that OFDM symbol, as a CP.

Radio transmitting section 111 performs transmission processing such as D/A conversion, amplification and up-conversion on the OFDM symbol with a CP, and transmits the result from antenna 112 to mobile station 200 (in FIG. 2).

On the other hand, radio receiving section 113 receives a SC-FDMA symbol transmitted from each mobile station, via antenna 112, and performs receiving processing such as down-conversion and A/D conversion on this SC-FDMA symbol.

CP removing section 114 removes the CP attached to the SC-FDMA symbol subjected to receiving processing.

Despreading section 115 despreads a response signal by the block-wise spreading code sequence used in second spreading in mobile station 200, and outputs the despread response signal to correlation processing section 116.

Correlation processing section 116 finds the correlation value between the despread response signal and the ZAC sequence used in the first spreading in mobile station 200, and outputs the correlation value to deciding section 117.

Deciding section 117 detects a response signal per mobile station by detecting the correlation peak of each mobile station in a detection window. For example, upon detecting a correlation peak in detection window #0 for mobile station #0, deciding section 117 detects a response signal from mobile station #0. Further, deciding section 117 decides whether the detected response signal is an ACK or NACK, by synchronization detection using the correlation value of a reference signal, and outputs an ACK or NACK to retransmission control section 106 on a per mobile station basis.

On the other hand, mobile station 200 shown in FIG. 2 receives mobile station group information, allocation information and downlink data transmitted from base station 100. The method of receiving these items of information will be explained below.

In mobile station 200 shown in FIG. 2, radio receiving section 202 receives an OFDM symbol transmitted from base station 100 (in FIG. 1), via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 performs an FFT of the OFDM symbol to acquire allocation information, broadcast information including mobile station group information, and downlink data, which are mapped on a plurality of subcarriers, and outputs the results to separating section 205.

Separating section 205 separates broadcast information arranged to resources secured in advance for broadcast channels, from signals received as input from FFT section 204, outputs the broadcast information to broadcast information decoding section 206 and outputs information other than the broadcast information to extracting section 207.

Broadcast information decoding section 206 decodes the broadcast information received as input from separating section 205 to acquire mobile station group information, and outputs the mobile station group information to extracting section 207.

Assume that extracting section 207 and decoding section 209 receive in advance coding rate information indicating the coding rate of allocation information, that is, information indicating the PDCCH CCE aggregation size. Here, information indicating the PDCCH CCE aggregation size may be designated from base station 100 or may be determined by mobile station 200 based on the received quality of pilot signals.

Also, upon receiving allocation information, extracting section 207 extracts allocation information subject to blind decoding from the plurality of subcarriers, according to the search space of a mobile station group to which the subject mobile station belongs, designated by the CCE aggregation size and mobile station group information received as input, and outputs the allocation information to demodulating section 208.

Demodulating section 208 demodulates the allocation information and outputs the result to decoding section 209.

Decoding section 209 decodes the allocation information according to the CCE aggregation size received as input, and outputs the result to deciding section 210.

On the other hand, upon receiving downlink data, extracting section 207 extracts downlink data for the subject mobile station from the plurality of subcarriers, according to a resource allocation result received as input from deciding section 210, and outputs the downlink data to demodulating section 212. This downlink data is demodulated in demodulating section 212, decoded in decoding section 213 and received as input in CRC section 214.

CRC section 214 performs an error detection of the decoded downlink data using CRC, generates an ACK in the case of CRC=OK (no error) or a NACK in the case of CRC=NG (error present), as a response signal, and outputs the generated response signal to modulating section 215. Further, in the ease of CRC=OK (no error), CRC section 214 outputs the decoded downlink data as received data.

Deciding section 210 performs a blind detection as to whether or not the allocation information received as input from decoding section 209 is directed to the subject mobile station. To be more specific, against the allocation information received as input from decoding section 209, deciding section 210 performs a blind detection as to whether or not the allocation information is directed to the subject mobile station. For example, if CRC=OK is found (i.e. no error is found) as a result of demasking CRC bits by the ID number of the subject mobile station, deciding section 210 decides that allocation information is directed to that mobile station. Further, deciding section 210 outputs the allocation information directed to the subject mobile station, that is, the resource allocation result of downlink data for that mobile station, to extracting section 207.

Further, deciding section 210 decides a PUCCH (Physical Uplink Control CHannel) to use to transmit a response signal from the subject mobile station, from the CCE number associated with a subcarrier to which a PDCCH allocated the allocation information for that mobile station is arranged. Further, deciding section 210 outputs the decision result (i.e. PUCCH number) to control section 211. That is, the PUCCH number is derived from the CCE number used in a PDCCH used for data allocation. For example, if the CCE associated with a subcarrier to which a PDCCH directed to the subject mobile station is arranged is CCE #0, deciding section 210 decides that PUCCH #0 associated with CCE #0 is the PUCCH for that mobile station. Also, for example, if the CCE's associated with subcarriers to which a PDCCH directed to the subject mobile station is arranged are CCE #0 to CCE #3, deciding section 210 decides that PUCCH #0 associated with CCE #0 of the minimum number among CCE #0 to CCE #3, is the PUCCH for that mobile station.

Based on the PUCCH number received as input from deciding section 210, control section 211 controls the cyclic shift value of the ZAC sequence used in the first spreading in spreading section 216 and the block-wise spreading code sequence which is used in second spreading in spreading section 219 and which is the spreading code sequence used in spreading per LB (Long Block). For example, control section 211 selects the ZAC sequence of the cyclic shift value associated with the PUCCH number received as input from deciding section 210, from among twelve ZAC's from ZAC #0 to ZAC #11, and sets the ZAC sequence in spreading section 216, and selects the block-wise spreading code sequence associated with the PUCCH number received as input from deciding section 210, from among three block-wise spreading code sequences from BW #0 to BW #2, and sets the block-wise spreading code sequence in spreading section 219. That is, control section 211 selects one of a plurality of resources defined by ZAC #0 to ZAC #11 and by BW #0 to BW #2.

Modulating section 215 modulates a response signal received as input from CRC section 214 and outputs the result to spreading section 216.

Spreading section 216 performs first spreading of the response signal by the ZAC sequence set in control section 211, and outputs the response signal subjected to the first spreading to IFFT section 217. That is, spreading section 216 performs the first spreading of the response signal using the ZAC sequence of the cyclic shift value associated with the resource selected in control section 211. Here, in the first spreading, it is equally possible to use sequences that can be separated from each other by varying cyclic shift values, other than ZAC sequences. For example, in the first spreading, it is equally possible to use GCL (Generalized Chirp Like) sequences, CAZAC (Constant Amplitude Zero Auto Correlation) sequences, ZC (Zadoff-Chu) sequences, or use PN sequences such as M sequences and orthogonal Gold code sequences.

IFFT section 217 performs an IFFT of the response signal subjected to the first spreading, and outputs the response signal subjected to an IFFT to CP attaching section 218.

CP attaching section 218 attaches the same signal as the tail end part of the response signal subjected to an IFFT, to the head of that response signal as a CP.

Spreading section 219 performs second spreading of the response signal with a CP by the block-wise spreading code sequence set in control section 211, and outputs the response signal subjected to second spreading to radio transmitting section 220. Here, in second spreading, as block-wise spreading code sequences, it is possible to use any sequences as long as these sequences can be regarded as sequences that are orthogonal or substantially orthogonal to each other. For example, in second spreading, it is possible to use Walsh sequences or Fourier sequences as block-wise spreading code sequences.

Radio transmitting section 220 performs transmission processing such as D/A conversion, amplification and up-conversion on the response signal subjected to second spreading, and transmits the result from antenna 201 to base station 100 (in FIG. 1).

Next, CCE allocating methods 1 to 4 in CCE allocating section 104 will be explained in detail.

<Allocating Method 1 (in FIG. 3)>

With the present allocating method, a PDCCH is allocated to a specific search space associated with the CCE aggregation size and mobile station group of that PDCCH, among a plurality of search spaces shared by a larger number of UE groups when the CCE aggregation size increases.

Figure 3:
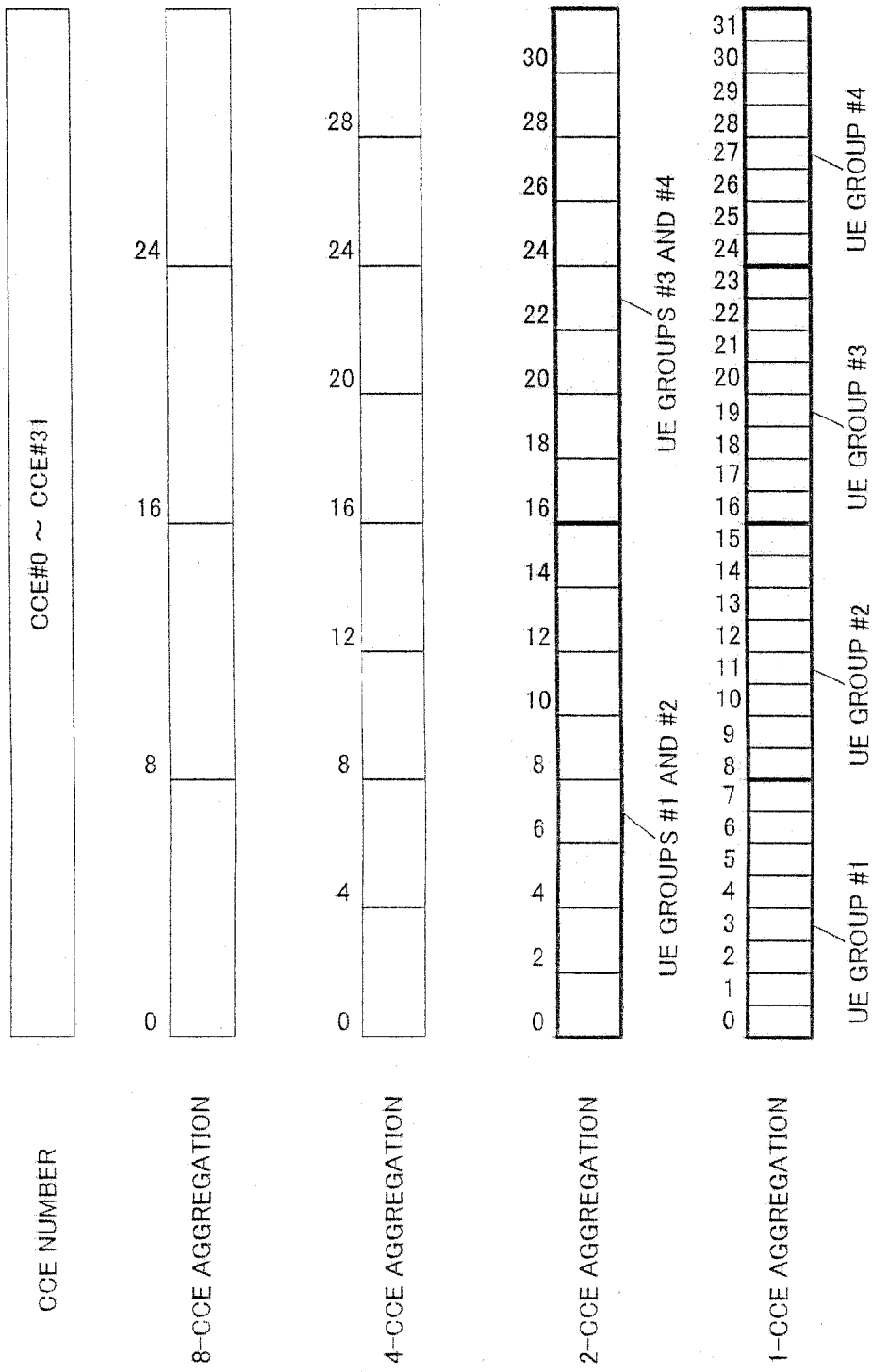
FIG. 3 shows search spaces of allocating method 1 according to Embodiment 1 of the present invention.

To be more specific, when the CCE aggregation size is 1, as shown in FIG. 3, the search space of UE group #1 is formed with eight CCE's from CCE #0 to CCE #7, the search space of UE group #2 is formed with eight CCE's from CCE #8 to CCE #15, the search space of UE group #3 is formed with eight CCE's from CCE #16 to CCE #23, and the search space of UE group #4 is formed with eight CCE's from CCE #24 to CCE #31.

Also, when the CCE aggregation size is 2, as shown in FIG. 3, the search space of UE groups #1 and #2 is formed with sixteen CCE's from CCE #0 to CCE #15, and the search space of UE groups #3 and #4 is formed with sixteen CCE's from CCE #16 to CCE #31.

Also, when the CCE aggregation size is 4 or 8, as shown in FIG. 3, the search space of UE groups #1 to #4 is formed with thirty-two CCE's from CCE #0 to CCE #31, that is, all CCE's.

When the CCE aggregation size increases, the number of UE groups that share one search space increases. To be more specific, referring to CCE #0, CCE #0 is used only by UE group #1 when the CCE aggregation size is 1, used by two UE groups #1 and #2 when the CCE aggregation size is 2, and used by all UE groups #1 to #4 when the CCE aggregation size is 4 or 8. Also, when the CCE aggregation size is maximum 8, the search space is shared by all UE groups, and, when the CCE aggregation size is minimum 1, the search space of each UE group varies between UE groups.

Also, when the CCE aggregation size increases, the search space associated with each UE group increases. To be more specific, referring to UE group #1, the search space of UE group #1 is formed with eight CCE's when the CCE aggregation size is 1, formed with sixteen CCE's when the CCE aggregation size is 2, and formed with thirty-two CCE's when the CCE aggregation size is 4 or 8.

Therefore, as shown in FIG. 3, with respect to the mobile stations of UE group #1, CCE allocating section 104 can allocate maximum eight PDCCH's of a CCE aggregation size of 1 to the search space from CCE #0 to CCE #7, and allocate maximum eight PDCCH's of a CCE aggregation size of 2 to the search space from CCE #0 to #15. Similarly, CCE allocating section 104 can allocate maximum eight PDCCH's of a CCE aggregation size of 4 to the search space from CCE #0 to CCE #31, and allocate maximum four PDCCH's of a CCE aggregation size of 8.

By this means, CCE allocating section 104 relaxes the allocation restriction for a mobile station to which a PDCCH of a larger CCE aggregation size is allocated. For example, a case will be explained where CCE allocating section 104 allocates a PDCCH of a CCE aggregation size of 1 and PDCCH of a CCE aggregation size of 8 for UE group #1. Also, in this case, assume that there are no mobile stations to which a PDCCH of a CCE aggregation size of 1 for UE group #2 is allocated.

Upon allocating PDCCH's to CCE's, CCE allocating section 104 allocates a PDCCH of a CCE aggregation size of 8, avoiding allocation of this PDCCH to the same CCE's as those for a PDCCH of a smaller CCE aggregation size, 1. To be more specific, avoiding the search space of UE group #1 from CCE #0 to CCE #7 of a CCE aggregation size of 1, CCE allocating section 104 allocates a PDCCH of a CCE aggregation size of 8. Here, there are no mobile stations to which a PDCCH of a CCE aggregation size of 1 for UE group #2 (where the search space ranges from CCE #8 to CCE #15) is allocated, so that CCE allocating section 104 allocates a PDCCH of a CCE aggregation size of 8 to CCE #8 to CCE #15. Further, CCE allocating section 104 allocates a PDCCH of a CCE aggregation size of 1 for UE group #1 to one of CCE #0 to CCE #7.

Thus, in base station 100, when the CCE aggregation size increases, a larger number of UE groups share search spaces. Therefore, when the CCE aggregation size increases, it is possible to allocate a PDCCH to CCE's of a wider range. By this means, even if PDCCH's of varying CCE aggregation sizes are allocated in the same UE group, by adjusting CCE allocation for a PDCCH of a larger CCE aggregation size, base station 100 can allocate these PDCCH's without limiting resource allocation.

On the other hand, mobile station 200 demodulates, decodes and performs blind detection of a PDCCH based on the CCE aggregation size and mobile station group information. For example, when mobile station 200 belonging to UE group #1 performs blind detection on the presumption that the CCE aggregation size is 1, extracting section 207 outputs only signals associated with CCE #0 to CCE #7, among CCE #0 to CCE #31 shown in FIG. 3, to demodulating section 208. That is, in demodulating section 208, decoding section 209 and deciding section 210, the target for blind detection in a case where the CCE aggregation size is 1, is limited to the search space corresponding to CCE #0 to CCE #7. Similarly, upon performing blind detection on the presumption that the CCE aggregation size is 2, extracting section 207 outputs only signals associated with CCE #0 to CCE #15, among CCE #0 to CCE #31 shown in FIG. 3, to demodulating section 208. Also, if it is presumed that the CCE aggregation size is 4 or 8, extracting section 207 outputs signals associated with CCE #0 to CCE #31 shown in FIG. 3, that is, signals associated with all CCE's, to demodulating section 208.

Here, when the CCE aggregation size is 1, the number of PDCCH's allocated to the eight CCE's in each of UE groups #1 to #4 is eight. Also, when the CCE aggregation size is 2, the number of PDCCH's allocated to the sixteen CCE's of UE groups #1, #2, #3 and #4 is eight. On the other hand, the number of PDCCH's allocated to CCE #0 to CCE #31 is eight when the CCE aggregation size is 4, or four when the CCE aggregation size is 8. That is, even in a case where the search space is formed with all CCE's from CCE #0 to CCE #31 when the CCE aggregation size is 4 or 8, compared to a case where the CCE aggregation size is 1 or 2, the number of PDCCH's subject to blind detection does not increase.

Also, the CCE aggregation size is determined based on the location of a mobile station in a cell or received quality. Therefore, the system performance is hardly influenced by the degradation of freedom degree of CCE allocation caused by limiting the CCE aggregation size of a received PDCCH on a per mobile station basis.

Also, the search space of each UE group is formed with consecutive CCE's, and, consequently, upon reporting a search space from a base station to a mobile station, the base station only needs to report the head CCE number and the end CCE number, so that it is possible to reduce the amount of report information.

Thus, according to this allocation example, a PDCCH is allocated to one of a plurality of search spaces shared by a larger number of UE's when the CCE aggregation size increases. By this means, a base station can allocate a PDCCH of a larger CCE aggregation size to CCE's such that these CCE's do not overlap with CCE's used for a PDCCH of a smaller CCE aggregation size. Therefore, with the present allocating method, it is possible to prevent resource allocation in UE groups from being limited without increasing the number of times of blind decoding.

<Allocating Method 2 (in FIG. 4)>

In the search spaces of allocating method 1 shown in FIG. 3, if at least one PDCCH of a CCE aggregation size of 8 for a given UE group is used, it is not possible to use any of PDCCH's of a CCE aggregation size of 1 for UE groups #1 to #4.

For example, in the search spaces shown in FIG. 3, assume that a PDCCH of a CCE aggregation size of 8 is used in CCE #0 to CCE #7. Here, as shown in FIG. 3, a PDCCH of a CCE aggregation size of 1 for UE group #1 is allocated to one of CCE #0 to CCE #7. However, CCE #0 to CCE #7 are already used by the PDCCH of a CCE aggregation size of 8, and, consequently, a base station cannot allocate the PDCCH of a CCE aggregation size of 1 for UE group #1. Also, similarly, when a PDCCH of a CCE aggregation size of 8 is allocated to CCE #8 to CCE #15, CCE #16 to CCE #23 or CCE #24 to CCE #31, it is not possible to use any of PDCCH's of a CCE aggregation size of 1 for UE groups #2 to #3.

Therefore, CCE allocating section 104 according to the present allocating method allocates a PDCCH to a specific search space formed with CCE's occupied by a plurality of PDCCH's of a larger CCE aggregation size than the CCE aggregation size of that PDCCH.

Figure 4:
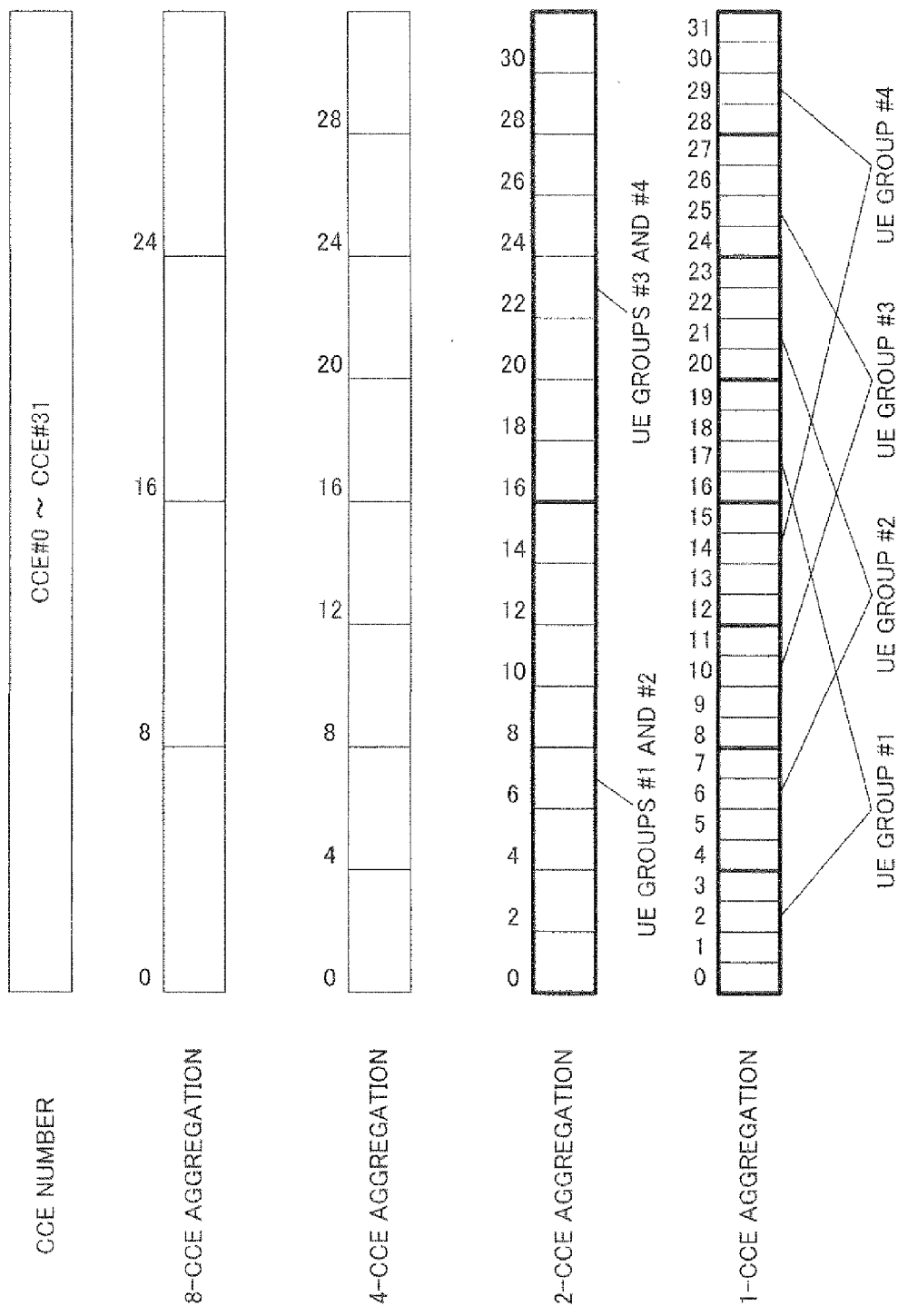
FIG. 4 shows search spaces of allocating method 2 according to Embodiment 1 of the present invention.

To be more specific, when the CCE aggregation size is 1, as shown in FIG. 4, the search space of UE group #1 is formed with eight CCE's from CCE #0 to CCE #3 and CCE #16 to CCE #19, and the search space of UE group #2 is formed with eight CCE's from CCE #4 to CCE #7 and CCE #20 to CCE #23. Similarly, the search space of UE group #3 is formed with eight CCE's from CCE #8 to CCE #11 and CCE #24 to CCE #27, and the search space of UE group #4 is formed with eight CCE's from CCE #12 to CCE #15 and CCE #28 to CCE #31.

Also, as shown in FIG. 4, the search spaces of CCE aggregation sizes of 2, 4 and 8 are formed in the same way as in allocating method 1 (in FIG. 3).

That is, the search spaces of a CCE aggregation size of 1 for UE groups #1 to #4 are separately arranged into two different PDCCH units among four PDCCH units (CCE #0 to CCE #7, CCE #8 to CCE #15, CCE #16 to CCE #23 and CCE #24 to CCE #31) to which a PDCCH of a CCE aggregation size of 8 is allocated. For example, the search space of a CCE aggregation size of 1 for UE group #1 (CCE #0 to CCE #3 and CCE #16 and CCE #19) is formed with CCE's included in two different PDCCH's of a CCE aggregation size of 8 (CCE #0 to CCE #7 and CCE #16 and CCE #23).

By this means, even in a case where a PDCCH of a CCE aggregation size of 8 is allocated to any of CCE #0 to CCE #31, if it is not possible to use one of search spaces separately arranged, it is possible to allocate a PDCCH to the other search space.

For example, in the search spaces shown in FIG. 4, assume that CCE allocating section 104 allocates a PDCCH of a CCE aggregation size of 8 for a given UE group, to CCE #0 to CCE ∩7. Here, in a case where a PDCCH of a CCE aggregation size of 1 for UE group #1 is further allocated, as shown in FIG. 4, CCE #0 to CCE #7 are already used, and therefore CCE allocating section 104 cannot allocate that PDCCH to CCE #0 to CCE #3, which form one of the search spaces of a CCE aggregation size of 1 for UE group #1. However, CCE #16 to CCE #19, which form the other search space of a CCE aggregation size of 1 for UE group #1, are not used, so that CCE allocating section 104 can allocate a PDCCH of a CCE aggregation size of 1 for UE group #1 to one of CCE #16 to CCE #19.

Thus, according to the present allocating method, a PDCCH is allocated to a specific search space formed with CCE's occupied by a plurality of PDCCH's of a larger CCE aggregation size than the CCE aggregation size of that PDCCH. That is, a base station allocates a PDCCH to specific search spaces separately arranged into different CCE's. By this means, even if PDCCH's of different CCE aggregation sizes are used at the same time, a PDCCH of a smaller CCE aggregation size can use any of CCE's separately arranged. Therefore, with the present allocating method, it is possible to further prevent resource allocation in UE groups from being limited.

Figure 5:
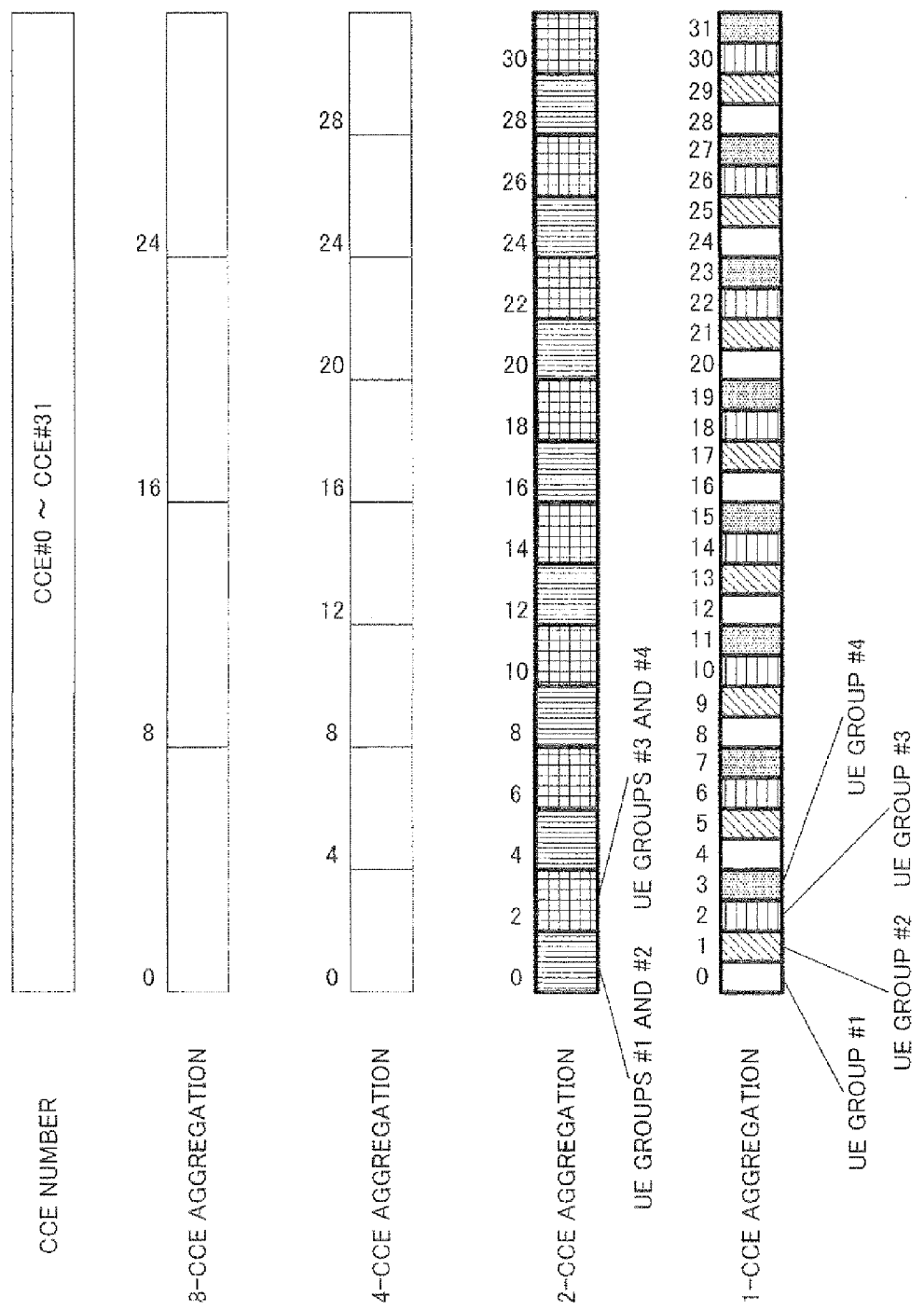
FIG. 5 shows other search spaces of allocating method 2 according to Embodiment 1 of the present invention.

Also, with the present allocating method, as shown in FIG. 5, the search spaces of a smaller CCE aggregation size for UE groups may be evenly included in each PDCCH unit of a larger CCE aggregation size. To be more specific, as shown in FIG. 5, for example, two search spaces of a CCE aggregation size of 1 for each of UE groups #1 to #4 may be included in each PDCCH unit of a CCE aggregation size of 8 (CCE #0 to CCE #7, CCE #8 to CCE #15, CCE #16 to CCE #23 and CCE #24 to CCE #31). Similarly, two search spaces of a CCE aggregation size of 2 for UE groups #1 and #2 and two search spaces of a CCE aggregation size of 2 for UE groups #3 and #4 may be included in each PDCCH unit of a CCE aggregation size of 8. That is, search spaces of CCE aggregation sizes of 1 and 2 for UE groups are separately arranged into four PDCCH units of a CCE aggregation size of 8. By this means, even in a case where a PDCCH of a larger CCE aggregation size is allocated to given CCE's, as in the present allocating method, it is possible to allocate a PDCCH of a smaller CCE aggregation size to any of CCE #0 to CCE #31, without limiting resource allocation.

<Allocating Method 3 (in FIG. 6)>

With the present allocating method, a case will be explained where each mobile station performs blind decoding in search spaces of a plurality of CCE aggregation sizes. For example, a mobile station that is located near the cell center performs blind decoding in search spaces of CCE aggregation sizes of 1 and 2. Also, a mobile station that is located near the cell edge performs blind decoding in search spaces of CCE aggregation sizes of 4 and 8. Also, a mobile station that is located between the cell center and the cell edge performs blind decoding in search spaces of CCE aggregation sizes of 2 and 4.

In this case, if PDCCH's of a plurality of different CCE aggregation sizes for the same UE group are used in the search spaces of allocating method 1 shown in FIG. 3, the use of PDCCH's of a CCE aggregation size of 1 or 2 may be limited.

For example, in the search spaces shown in FIG. 3, assume that a PDCCH of a CCE aggregation size of 8 for UE group #1 (CCE #0 to CCE #7) is used. Here, as shown in FIG. 3, the search space of UE group #1 is formed with CCE #0 to CCE #7 when the CCE aggregation size is 1, and the search space of UE group #1 (shared by UE group #2) is formed with CCE #0 to CCE #15 when the CCE aggregation size is 2. That is, the search spaces of CCE aggregation sizes of 1 and 2 are formed using overlapping CCE #0 to CCE #7. Therefore, all CCE's from CCE #0 to CCE #7 are already used by a PDCCH of a CCE aggregation size of 8, and, consequently, a base station cannot allocate a PDCCH of a CCE aggregation size of 1 for UE group #1, and can allocate a PDCCH of a CCE aggregation size of 2 for UE group #1 only to CCE #8 to CCE #15.

Therefore, CCE allocating section 104 according to the present allocating method allocates a PDCCH to a specific search space, among a plurality of search spaces formed with varying CCE's of varying CCE aggregation sizes in the same UE group.

Figure 6:
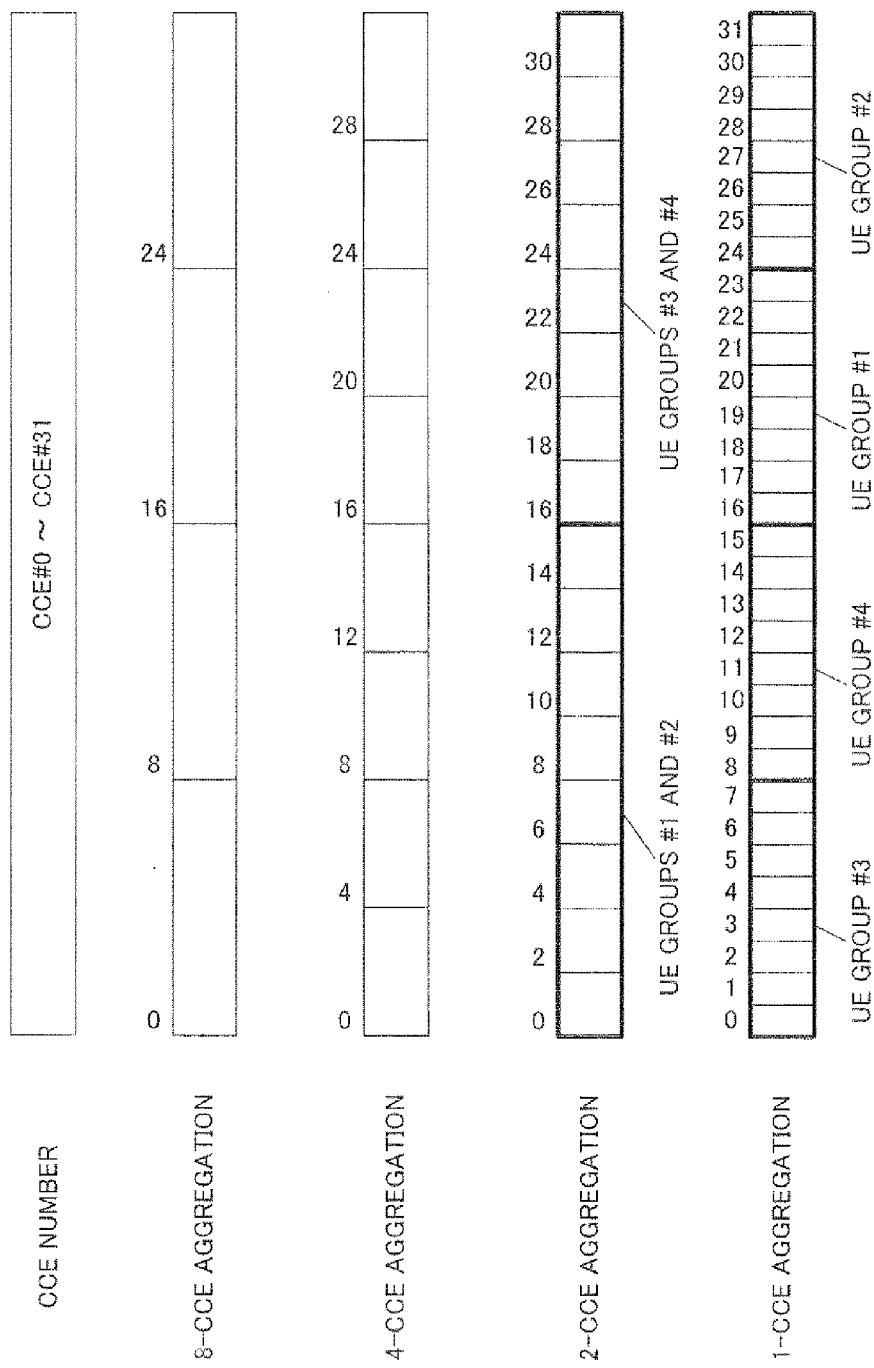
FIG. 6 shows search spaces of allocating method 3 according to Embodiment 1 of the present invention.

To be more specific, when the CCE aggregation size is 1, as shown in FIG. 6, the search space of UE group #1 is formed with eight CCE's from CCE #16 to CCE #23, and the search space of UE group #2 is formed with eight CCE's from CCE #24 to CCE #31. Also, the search space of UE group #3 is formed with eight CCE's from CCE #0 to CCE #7, and the search space of UE group #4 is formed with eight CCE's from CCE #8 to CCE #15.

Also, as shown in FIG. 6, search spaces of CCE aggregation sizes of 2, 4 and 8 are formed in the same way as in allocating method 1 (in FIG. 3).

That is, in the same UE group, a search space of a CCE aggregation size of 1 for each UE group is formed with different CCE's from a search space of a CCE aggregation size of 2. For example, the search space of a CCE aggregation size of 1 for UE group #1 (CCE #16 to CCE #23) and the search space of a CCE aggregation size of 1 for UE group #2 (CCE #24 to CCE #31) are formed with different CCE's from the search space of a CCE aggregation size of 2 for UE groups #1 and #2 (CCE #0 to CCE #15). The same applies to UE groups #3 and #4.

By this means, the selection range of CCE's forming search spaces with CCE aggregation sizes of 1 and 2 is wider than in allocating method 1 (in FIG. 3), and, consequently, resource allocation for mobile stations to which PDCCH's of CCE aggregation sizes of 1 and 2 are allocated (i.e. mobile stations near the cell center) becomes flexible. For example, assume that a PDCCH of a CCE aggregation size of 8 (i.e. a PDCCH directed to a mobile station near the cell edge) is allocated to CCE #0 to CCE #7. In this case, CCE allocating section 104 cannot allocate a PDCCH of a CCE aggregation size of 1 or 2 for UE group #1 (i.e. a PDCCH directed to a mobile station near the cell center) to CCE #0 to CCE #7.

However, CCE allocating section 104 can allocate a PDCCH of a CCE aggregation size of 2 to CCE #8 to CCE #15 and allocate a PDCCH of a CCE aggregation size of 1 to CCE #16 to CCE #23. That is, according to the present allocating method, by forming search spaces of smaller CCE aggregation sizes with non-overlapping CCE's, CCE allocating section 104 can flexibly allocate PDCCH's of smaller CCE aggregation sizes of 1 and 2.

Thus, according to the present allocating method, a PDCCH is allocated to a specific search space, among a plurality of search spaces formed with varying CCE's of varying CCE aggregation sizes in the same UE group. By this means, the selection range of search spaces of smaller CCE aggregation sizes is wider than in allocating method 1. By this means, even if a PDCCH of a larger CCE aggregation size is used, it is possible to flexibly allocate PDCCH's of smaller CCE aggregation sizes. Therefore, with the present allocating method, even if each mobile station performs blind decoding in search spaces of a plurality of CCE aggregation sizes, it is possible to prevent resource allocation in UE groups from being limited.

<Allocating Method 4 (in FIG. 7)>

Upon associating the CCE numbers used in uplink resource allocation and the PUCCH numbers for transmitting a response signal, a mobile station decides that the PUCCH, which is associated with the CCE of the minimum number among one or a plurality of CCE's forming the PDCCH to which allocation information for that mobile station is arranged, is the PUCCH for that mobile station. Therefore, if all CCE's (e.g. CCE #0 to CCE #31) are associated with PUCCH's on a one-to-one basis, the amount of resources for use becomes enormous.

Therefore, CCE allocating section 104 according to the present allocating method allocates a PDCCH to a specific search space, among a plurality of search spaces formed with a smaller number of CCE's when the CCE aggregation size is smaller.

Figure 7:
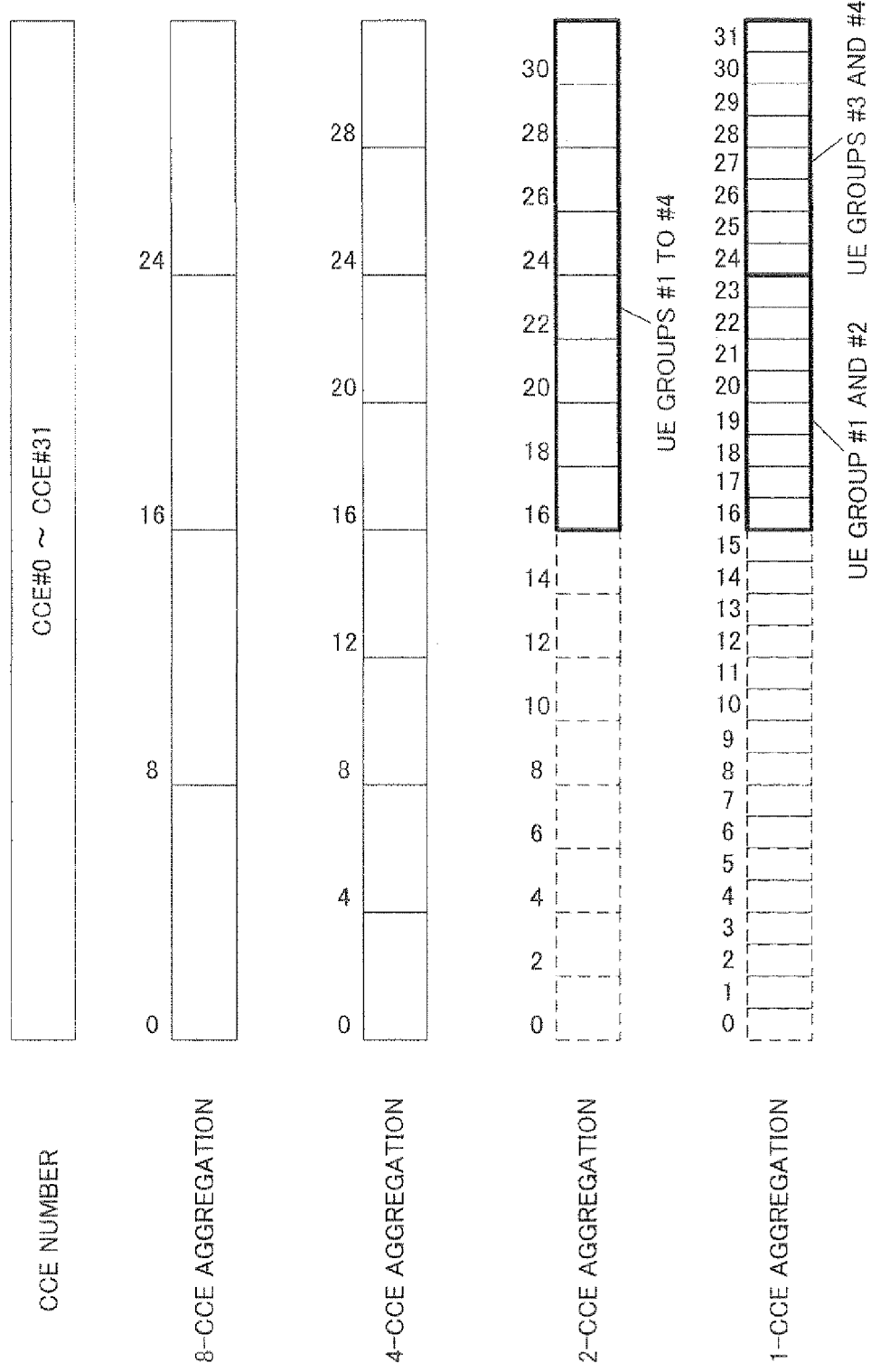
FIG. 7 shows search spaces of allocating method 4 according to Embodiment 1 of the present invention.

To be more specific, when the CCE aggregation size is 1, as shown in FIG. 7, the search spaces of UE groups #1 and #2 are formed with eight CCE's from CCE #16 to CCE #23, and the search spaces of UE groups #3 and #4 are formed with eight CCE's from CCE #24 to CCE #31. Also, when the CCE aggregation size is 2, the search spaces of UE groups #1 to #4 are formed with sixteen CCE's from CCE #16 to CCE #31. Also, as shown in FIG. 7, the search spaces of CCE aggregation sizes of 4 and 8 are formed in the same way as in allocating method 1 (in FIG. 3).

Therefore, in the case of a smaller CCE aggregation size of 1 or 2, the search spaces of UE groups #1 to #4 are formed with sixteen CCE's, which are half of thirty-two CCE's from CCE #0 to CCE #31. That is, as shown in FIG. 7, when the CCE aggregation size is 1 or 2, CCE #0 to CCE #15 are not used.

As above, CCE #0 to CCE #15 shown in FIG. 7 are used only for PDCCH's of CCE aggregation sizes of 4 and 8. Therefore, upon allocating a PDCCH of a CCE aggregation size of 4 or 8, CCE allocating section 104 preferentially uses CCE #0 to CCE #15. By this means, CCE allocating section 104 can allocate PDCCH's of CCE aggregation sizes of 1 and 2 to search spaces of CCE #16 to CCE #31, without limiting resource allocation.

Also, PDCCH's of CCE aggregation sizes of 1 and 2 are not used in the search spaces of CCE #0 to CCE #15 shown in FIG. 7, so that, among the CCE's forming each PDCCH of CCE aggregation sizes of 4 and 8, a resource for only the PUCCH associated with the CCE of the minimum number is secured. That is, as shown in FIG. 7, resources for four PUCCH's respectively associated with four CCE's (CCE #0, CCE #4, CCE #8 and CCE #12) are secured. Therefore, among fifteen CCE's from CCE #0 to CCE #15, it is necessary to secure resources only for PUCCH's associated with the four CCE's. Also, PDCCH's of CCE aggregation sizes of 1 and 2 are used in CCE #16 to CCE #31, and therefore resources for sixteen PUCCH's respectively associated with sixteen CCE's from CCE #16 to CCE #31 are secured. Thus, by limiting the number of CCE's forming search spaces of smaller CCE aggregation sizes, it is possible to reduce the amount of resources to secure for PUCCH's associated with CCE's.

Thus, according to the present allocating method, as in allocating method 1, it is possible to allocate PDCCH's of smaller CCE aggregation sizes to CCE's without limiting resource allocation, and further reduce the amount of resources to secure for PUCCH's associated with CCE's.

Also, with the present allocating method, it is equally possible to switch the definition of search spaces in a semi-static manner, depending on the amount of traffics. For example, it is possible to use the definition of search spaces according to the present allocating method (in FIG. 7) when the amount of traffics is low, or use, for example, the definition of search spaces according to allocating method 3 (in FIG. 6) when the amount of traffics is high. By this means, it is possible to secure the amount of resources for PUCCH's associated with CCE's, without loss.

Also, a case has been described with the present allocating method where search spaces of CCE aggregation sizes of 1 and 2 are formed with CCE #16 to CCE #31. However, with the present allocating method, it is equally possible to form search spaces of CCE aggregations of 1 and 2 with CCE #0 to CCE #15.

Also, although a case has been described above with the present allocating method where CCE's and PUCCH's (i.e. response signals to downlink data) are associated, even if CCE's and PHICH's (physical hybrid ARQ indicator channels) are associated, the present invention can provide the same effect as above. Here, response signals to uplink data are allocated to PHICH's.

Also, a PUCCH used in the explanation of the present allocating method is a channel for feeding back an ACK or NACK, and therefore can be referred to as "ACK/NACK channel."

Also, even in a case where control information other than response signals is fed back, the present invention can be implemented as above.

Allocating methods 1 to 4 of PDCCH's according to the present embodiment have been described above.

Thus, according to the present embodiment, a PDCCH of a larger CCE aggregation size can flexibly use CCE's such that these CCE's do not overlap with CCE's allocated to a PDCCH of a smaller CCE aggregation size. Therefore, according to the present embodiment, it is possible to prevent resource allocation in UE groups from being limited.

Figure 8:
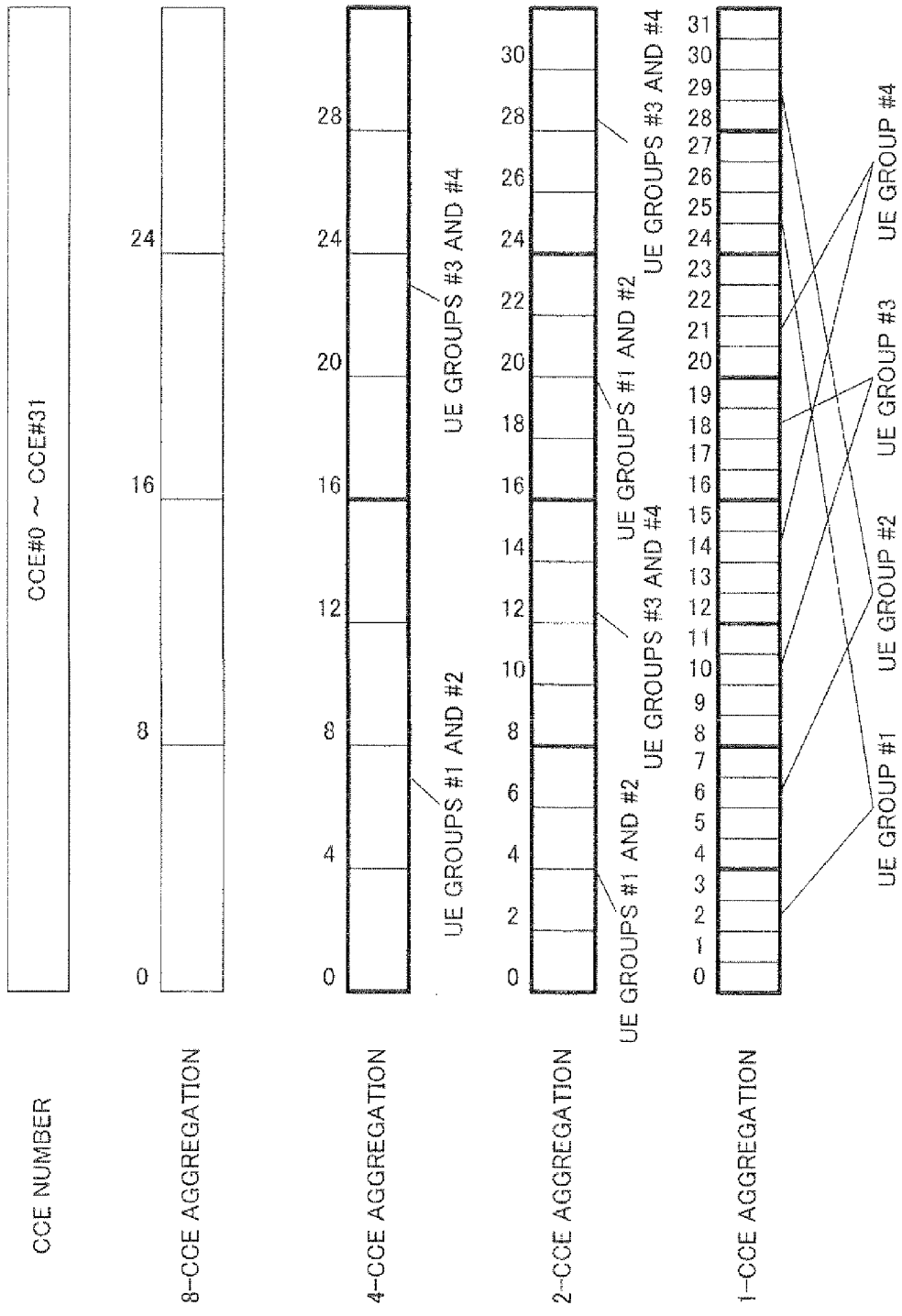
FIG. 8 shows other search spaces according to Embodiment 1 of the present invention.

Also, with the present embodiment, it is equally possible to form search spaces by combining above allocating methods 1 to 4. For example, FIG. 8 shows search spaces acquired by combining allocating methods 2 and 3. Here, as shown in FIG. 8, in a case where the CCE aggregation size is 4, the search spaces of UE groups #1 and #2 are formed with CCE #0 to CCE #15, and the search spaces of UE groups #3 and #4 are formed with CCE #16 to CCE #31. In this case, as in allocating method 2, the search spaces of a CCE aggregation size of 2 for each UE group are separately arranged such that these search spaces are included in two search spaces of a CCE aggregation size of 4. Also, as in allocating method 2, the search spaces of a CCE aggregation size of 1 are separately arranged into CCE's occupied by varying PDCCH's of a larger CCE aggregation size. Further, as in allocating method 3, part of the search spaces of a CCE aggregation size of 1 is formed with different CCE's from search spaces of varying CCE aggregation sizes in the same UE group. For example, one of search spaces of a CCE aggregation size of 1 for UE group #1 (e.g. CCE #0 to CCE #3) overlaps with a search space of a CCE aggregation size of 2 (CCE #0 to CCE #8). However, the other search space (e.g. CCE #24 to CCE #27) does not overlap with any of the search spaces of a CCE aggregation size of 2 (CCE #0 to CCE #8 and CCE #16 to CCE #23). By this means, it is possible to provide the same advantage as in allocating methods 2 and 3 according to the present embodiment.

Embodiment 2

With the present embodiment, search spaces of varying CCE aggregation sizes of each UE group are formed with varying CCE's.

Figure 9:
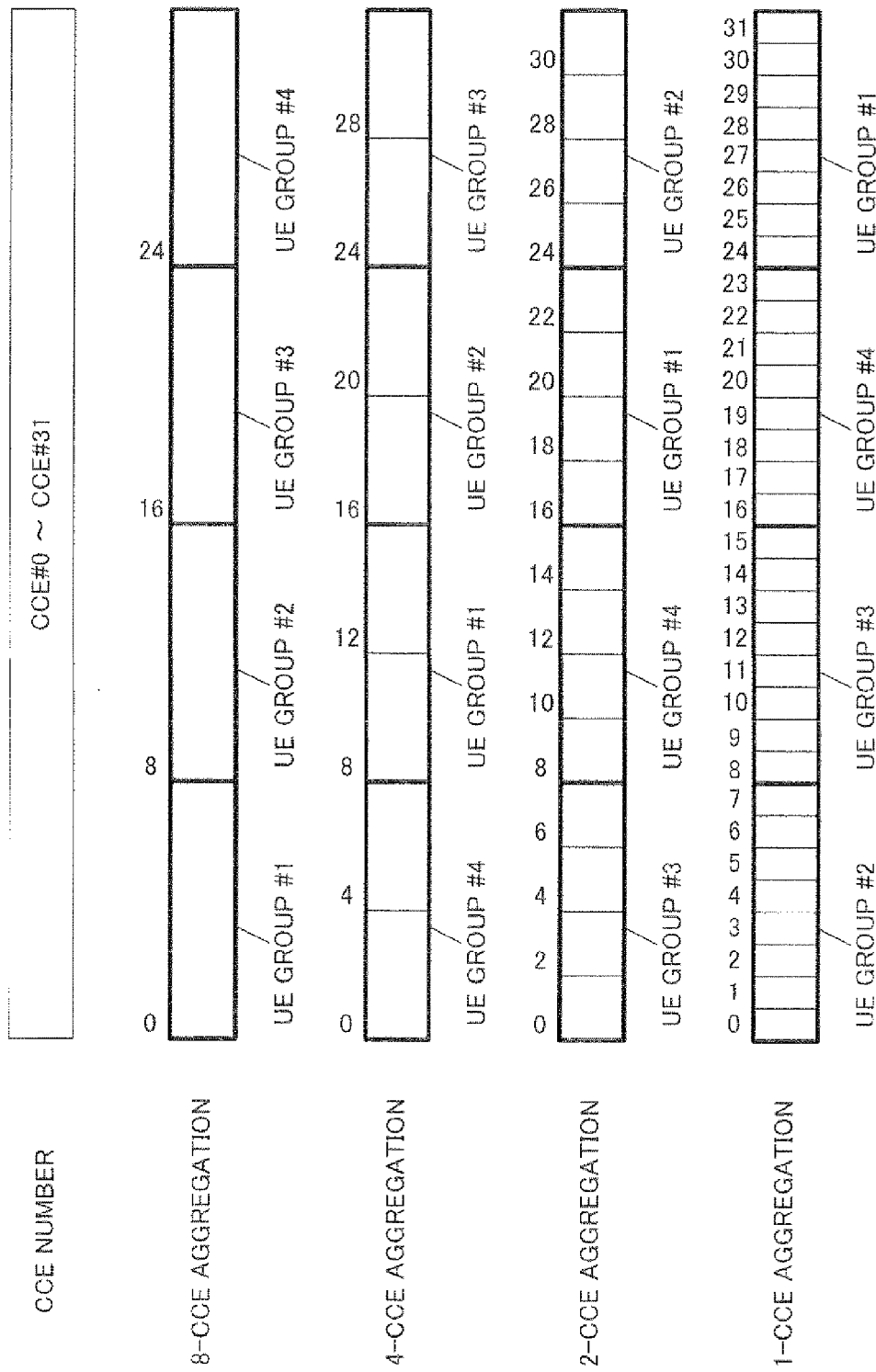
FIG. 9 shows search spaces according to Embodiment 2 of the present invention.

In the following explanation, the search space of each CCE aggregation size for UE groups #1 to #4 is formed with eight CCE's. To be more specific, as shown in FIG. 9, in UE group #1, the search space of a CCE aggregation size of 1 is formed with eight CCE's from CCE #24 to CCE #31, the search space of a CCE aggregation size of 2 is formed with eight CCE's from CCE #16 to CCE #23, the search space of a CCE aggregation size of 4 is formed with eight CCE's from CCE #8 to CCE #15, and the search space of a CCE aggregation size of 8 is formed with eight CCE's from CCE #0 to CCE #7. As shown in FIG. 9, the same applies to UE groups #2 to #4.

That is, as shown in FIG. 9, the search spaces of CCE aggregation sizes of 1, 2, 4 and 8 for each UE group are formed with varying CCE's over entire CCE #0 to CCE #31. By this means, even in a case where a PDCCH of a larger CCE aggregation size (e.g. a PDCCH of a CCE aggregation size of 8) is used, CCE allocating section 104 can allocate PDCCH's of smaller CCE aggregation sizes reliably. That is, in the same UE group, even in a case where a PDCCH of a larger CCE aggregation size is used, there is no possibility that a PDCCH of a smaller CCE aggregation size cannot be allocated. Also, in the same way as in allocating method 3 of Embodiment 1, search spaces of varying CCE aggregation sizes are formed with varying CCE's. Therefore, even in a case where each mobile station performs blind decoding in search spaces of a plurality of CCE aggregation sizes, in the same way as in allocating method 3 of Embodiment 1, CCE allocating section 104 can flexibly allocate a PDCCH to more CCE's without using overlapping CCE's.

Thus, according to the present embodiment, search spaces of varying CCE aggregation sizes in the same UE group are formed with varying CCE's. By this means, even in a case where PDCCH's of different CCE aggregation sizes in the same UE group are allocated at the same time, it is possible to prevent a case where PDCCH's of smaller aggregation sizes cannot be allocated. Therefore, according to the present embodiment, as in Embodiment 1, it is possible to prevent resource allocation in UE groups from being limited.

Further, with the present embodiment, the number of CCE's forming search spaces is the same between all CCE aggregation sizes (e.g. eight CCE's in FIG. 9), so that it is not necessary to set parameters on a per CCE aggregation size basis. Therefore, according to the present embodiment, it is possible to simplify the system.

Figure 10:
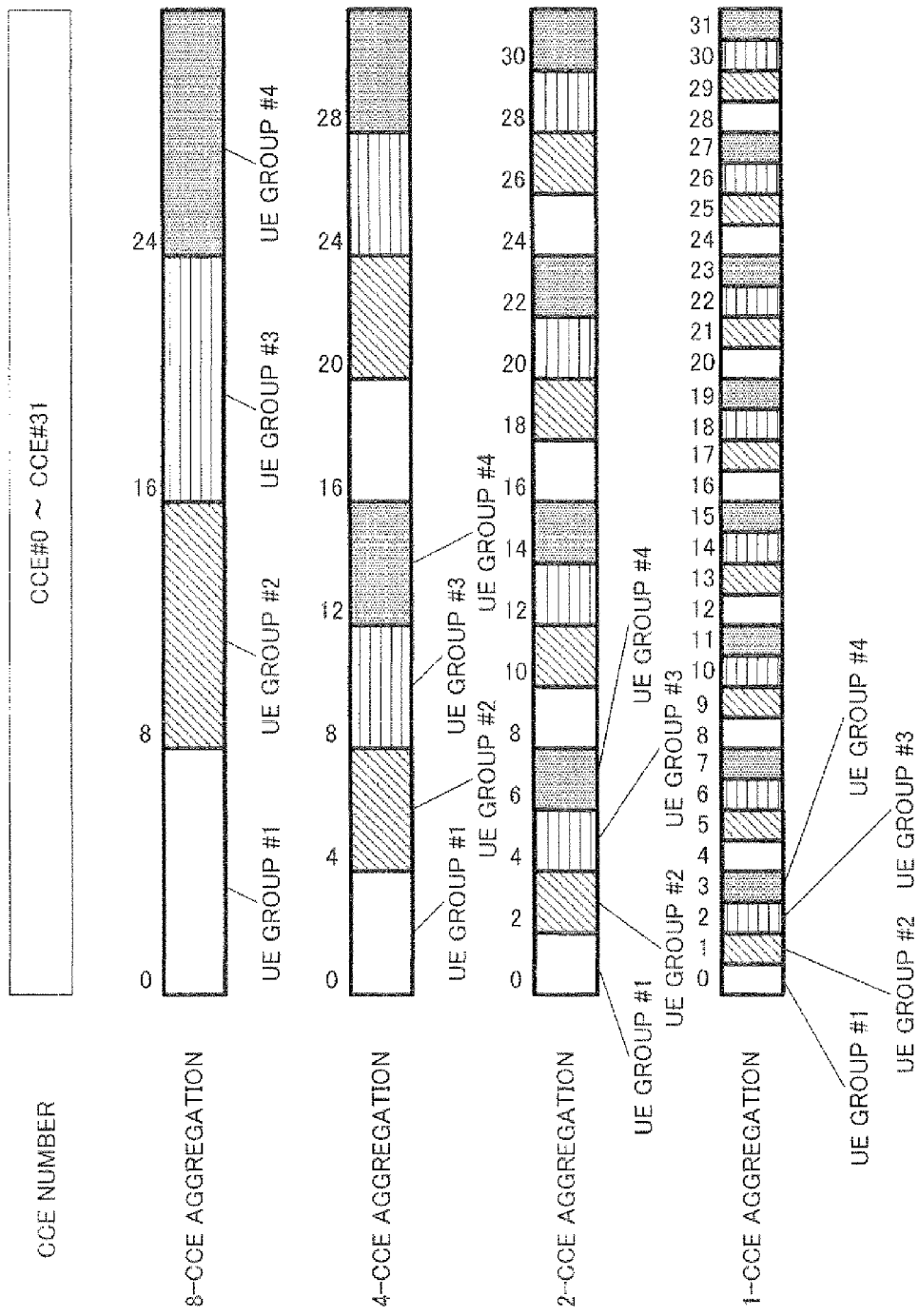
FIG. 10 shows other search spaces according to Embodiment 2 of the present invention.

Also, as shown in FIG. 10, it is equally possible to separately arrange the search space of each CCE aggregation size for each UE group over CCE #0 to CCE #31. That is, as shown in FIG. 10, search spaces of different CCE aggregation sizes in the same UE group are each formed with eight CCE's separately arranged over CCE #0 to CCE #31. Here, as in allocating method 2 of Embodiment 1, in the same UE group, search spaces of a smaller CCE aggregation size are formed with CCE's included in each of a plurality of varying search spaces of a larger CCE aggregation size. By this means, even in a case where it is not possible to use one search space, it is possible to use other search spaces, so that it is possible to prevent resource allocation from being limited. By this means, it is possible to provide the same advantage as in the present embodiment and provide the same advantage as in allocating method 2 of Embodiment 1.

Embodiments of the present invention have been described above.

Also, a mobile station may be referred to as "terminal station," "UE," "MT," "MS" or "STA (STAtion)". Also, a base station may be referred to as "Node B," "BS" or "AP." Also, a subcarrier may be referred to as "tone," Also, a CP may be referred to as "GI (Guard interval)". Also, a CCE number may be referred to as "CCE index."

Also, all mobile stations or a plurality of mobile stations in a cell need to receive, for example, a PDCCH used to report resource allocation for transmitting control channels such as a D-BCH (Dynamic-Broadcast Channel) in which broadcast information is transmitted and a PCH (Paging CHannel) in which paging information is transmitted. That is, these control channels need to be reported up to mobile stations near the cell edge, and, consequently, allocation of a PDCCH of a CCE aggregation size of 8 is possible. Therefore, by applying the present invention, even in the case of using a D-BCH or PCH (of a CCE aggregation size of 8), it is possible to allocate PDCCH's of other CCE aggregation sizes to specific search spaces, without limiting resource allocation.

Also, the error detecting method is not limited to CRC check.

Also, a method of performing conversion between the frequency domain and the time domain is not limited to the IFFT and FFT.

Also, although cases have been described with the above embodiments where signals are transmitted using OFDM as a downlink transmission scheme and SC-FDMA as an uplink transmission scheme, the present invention is equally applicable to eases where transmission schemes other than OFDM and SC-FDMA are used.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-000196, filed on Jan. 4, 2008, including the specification, drawings and abstract, is incorporated herein by reference in its entirety.

INDUSTRIAL APPLICABILITY

The present invention is applicable to, for example, mobile communication systems.

The invention claimed is:

1. A radio communication base station apparatus comprising:
    processing circuitry configured to allocate a control channel to one or more control channel element(s) (CCE(s)) in a search space, which is comprised of a plurality of CCEs associated with an aggregation size of the one or more CCE(s) and a user equipment (UE) group,
    wherein:
        a plurality of UEs are grouped into UE groups,
        the search space is a CCE field subject to blind decoding by each of the plurality of UEs,
        control channels for different UEs are allocated to different CCEs in the search space, and
        the search space is shared by more of the UE groups when the aggregation size is larger; and
    a transmitter configured to transmit the allocated control channel.

2. The radio communication base station apparatus according to claim 1, wherein the search space is comprised of more CCEs when the aggregation size is larger.

3. The radio communication base station apparatus according to claim 1, wherein a search space associated with a largest aggregation size is shared by all of the UE groups, and a search space associated with a smallest aggregation size varies between the UE groups.

4. The radio communication base station apparatus according to claim 1, wherein a search space associated with a smaller aggregation size is comprised of CCEs, of which at least two search spaces associated with a larger aggregation size are comprised.

5. The radio communication base station apparatus according to claim 1, wherein a search space associated with a same UE group and respectively associated with different aggregation sizes are comprised of CCEs different from each of the search spaces.

6. The radio communication base station apparatus according to claim 1, wherein search spaces are comprised of less CCEs when the aggregation size is smaller.

7. The radio communication base station apparatus according to claim 1, wherein the allocating section allocates the control channel to the one or more CCE(s) in a specific search space among a plurality of search spaces, the specific search space being associated with the aggregation size of the control channel and the UE group of the control channel, and each of the one or more CCE(s) comprising the plurality of search spaces is shared by more of the UE groups when the aggregation size is larger.

8. A radio communication mobile station apparatus comprising:
    a receiver configured to receive a control channel which is allocated to one or more control channel element(s) (CCE(s)) in a specific search space, which is comprised of a plurality of CCEs associated with an aggregation size of the one or more CCE(s) and a user equipment (UE) group,
    wherein:
        a plurality of UEs are grouped into UE groups,
        the search space is a CCE field subject to blind decoding by each of the plurality of UEs,
        control channels for different UEs are allocated to different CCEs in the search space, and
        the search space is shared by more of the UE groups when the aggregation size is larger; and
    a decoder configured to decode the control channel in the search space.

9. A control channel allocating method performed by a radio communication base station apparatus comprising:
    allocating a control channel to one or more control channel element(s) (CCE(s)) in a search space, which is comprised of a plurality of CCEs associated with an aggregation size of the one or more CCEs and a user equipment (UE) group,
    wherein:
        a plurality of UEs are grouped into UE groups,
        the search space is a CCE field subject to blind decoding by each of the plurality of UEs,
        control channels for different UEs are allocated to different CCEs in the search space, and
        the search space is shared by more of the UE groups when the aggregation size is larger.

* * * * *